UNITED STATES PATENT OFFICE.

AUGUST von WASSERMANN, OF BERLIN, AND ERNST WASSERMANN, OF FRANKFORT-ON-THE-MAIN, GERMANY.

PROCESS FOR THE PREPARATION OF COLORED SELENIFEROUS AND TELLURIFEROUS SUBSTANCES.

1,061,889.  Specification of Letters Patent.  Patented May 13, 1913.

No Drawing.   Application filed January 24, 1912.   Serial No. 673,136.

*To all whom it may concern:*

Be it known that we, AUGUST VON WASSERMANN, privy medical councillor and university professor, and ERNST WASSERMANN, chemist, citizens of the German Empire, residing at Rauchstrasse 7, Berlin, and Liebigstrasse 21ª, Frankfort-on-the-Main, Germany, have invented certain new and useful Improvements in Processes for the Preparation of Colored Seleniferous and Telluriferous Substances, of which the following is a specification.

The present invention relates to a new or improved process for the preparation of colored seleniferous or telluriferous substances. It is based on the observation that when fairly concentrated aqueous solutions of salts of halogenated dyestuffs of the phthalein series are treated with suitable compounds of selenium or tellurium, precipitates are obtained which consist of new seleniferous or telluriferous compounds respectively. Among the compounds of tellurium and selenium, the ammonium, sodium and potassium salts of seleno- and telluro-cyanic acid have proved to be particularly suitable.

The following example will serve to illustrate the method of carrying out the new process:—10 parts of the technically pure sodium salt of eosin are dissolved in 10 parts of water. To this solution are added about 4 parts of potassium seleno-cyanid, whereupon this salt at first passes into solution. After a short time, however, a dark red precipitate is formed which in a few hours' time can be separated from the supernatant liquid. Selenium can easily be detected in the precipitate.

The new substances form excellent dyestuffs. They can, moreover, be employed for introducing selenium and tellurium into the animal body, and by this means selenium and tellurium can also be introduced into parts of the body into which such introduction has not so far been possible with the compounds of these substances hitherto known.

The products obtained according to the present invention are less poisonous than the raw substances from which they are prepared. These products are very unstable combinations or so-called adsorptions which very easily split off the selenium. They are characterized mainly by their biologic efficiency. For example, they have, when introduced into the blood circulation of white mice, the ability of coloring red swellings or tumors. Heretofore, that property has not been possessed by any other dye or color. For instance, the raw substance, such for example as sodium salt of eosin, does not possess this property.

What we claim is:—

1. Process for the preparation of seleniferous and telluriferous colored substances, which consists in allowing salts of halogenated dyestuffs of the phthalein series to re-act with suitable compounds of selenium or tellurium.

2. Process for the preparation of seleniferous colored substances, which consists in allowing salts of halogenated dyestuffs of the phthalein series to re-act with alkali salts of the seleno cyanic acid or telluro cyanic acid, and in separating the so formed precipitate from the supernatant liquid.

3. As new articles of manufacture, colored compounds of the halogenated dyestuffs of the phthalein series containing selenium having a very dark color when dry and in the form of a powder, and being more readily soluble in water than the raw material, having an intensive blood red color when so dissolved.

In testimony whereof we have hereunto set our hands in presence of two subscribing witnesses.

AUGUST von WASSERMANN.
ERNST WASSERMANN.

Witnesses:
  HENRY HASPER,
  WOLDEMAR HAUPT.